US008717922B2

(12) United States Patent
Xin et al.

(10) Patent No.: US 8,717,922 B2
(45) Date of Patent: May 6, 2014

(54) MULTITAPER SPECTRUM SENSING SYSTEMS AND METHODS

(75) Inventors: Yan Xin, Princeton, NJ (US); Kyungtae Kim, West Windsor, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 244 days.

(21) Appl. No.: 13/284,442

(22) Filed: Oct. 28, 2011

(65) Prior Publication Data

US 2012/0195214 A1  Aug. 2, 2012

Related U.S. Application Data

(60) Provisional application No. 61/437,164, filed on Jan. 28, 2011.

(51) Int. Cl.
 *H04L 12/26* (2006.01)
(52) U.S. Cl.
 USPC .......................................... 370/252; 375/224
(58) Field of Classification Search
 USPC .......................................... 370/252; 375/224
 See application file for complete search history.

(56) References Cited

U.S. PATENT DOCUMENTS

| 6,735,243 | B1 * | 5/2004 | Akopian | ........................ | 375/150 |
|---|---|---|---|---|---|
| 2008/0253436 | A1 * | 10/2008 | Bellec | ........................... | 375/224 |
| 2012/0309442 | A1 * | 12/2012 | Nentwig | ........................ | 455/509 |

OTHER PUBLICATIONS

Chiang, T., et al. "Optimal Detector for Multitaper Spectrum Estimator in Cognitive Radios" Proceedings of the Global Communications Conference, 2009. Globecom 2009. Nov. 2009. (6 Pages).
Haykin, S., et al. "Spectrum Sensing for Cognitive Radio" Proceedings of the IEEE, vol. 97, No. 5. May 2009. pp. 849-877.
Kim, S., et al. "Rate-Optimal and Reduced-Complexity Sequential Sensing Algorithms for Cognitive OFDM Radios" EURASIP Journal on Advances in Signal Processing, Special Issue on Dynamic Spectrum Access for Wireless Networking, Article ID 421540, Sep. 2009. (11 Pages).
Lunden, J., et al. "Spectrum Sensing in Cognitive Radios Based on Multiple Cyclic Frequencies" Proceedings of the 2nd International Conference on Cognitive Radio Oriented Wireless Networks and Communications (CrownCom). Jul. 2007. pp. 37-43.
Riedel, K., et al. "Minimum Bias Multiple Taper Spectral Estimation" IEEE Transactions on Signal Processing, vol. 43, No. 1. Jan. 1995. pp. 188-195.
Tandra, R., et al. "SNR Walls for Signal Detection" IEEE Symposium on Dynamic Spectrum Access Networks (DySpAN). Oct. 2008. pp. 1-30.
Thomson, D., et al. "Spectrum Estimation and Harmonic Analysis" Proceedings of the IEEE, vol. 70, No. 9. Sep. 1982. pp. 1055-1096.

(Continued)

*Primary Examiner* — Wei Zhao
(74) *Attorney, Agent, or Firm* — Joseph Kolodka

(57) ABSTRACT

Spectrum sensing methods and systems for detecting spectrum holes for use in cognitive radio secondary transmissions are disclosed. In one method, an indication of an assignment of a set of subcarriers to a primary user is received. The method further includes determining multitaper spectral estimates for at least a subset of the set of subcarriers based on the assignment of the set of subcarriers to the primary user by processing samples for the at least a subset of the set of subcarriers. In addition, a test statistic that is based on the multitaper spectral estimates is compared to a threshold to determine whether the set of subcarriers is utilized for primary transmissions to the primary user. Moreover, data signals are received on at least one of the subcarriers in the set of subcarriers if the set of subcarriers is not utilized for primary transmissions to the primary user.

14 Claims, 5 Drawing Sheets

(56) References Cited

OTHER PUBLICATIONS

Tugnait, J. "Wideband Spectrum Sensing for Cognitive Radios in Unknown Noise via Power Spectrum Analysis" 2010 IEEE. 2010. pp. 175-179.

Xin, Y., et al. "Efficient Channel Search Algorithms for Cognitive Radio in a Multichannel System" Proceedings of the Global Communications Conference, 2010. GLOBECOM 2010, Dec. 2010. (5 Pages).

Xin, Y., et al. "Fast Wideband Spectrum Scanning for Multi-Channel Cognitive Radio Systems" 44th Annual Conference on Information Sciences and Systems, CISS 2010. Mar. 2010. (6 Pages).

Xin, Y., et al. "SSCT: A Simple Sequential Spectrum Sensing Scheme for Cognitive Radio" Proceedings of the Global Communications Conference, 2009. GLOBECOM 2009. Nov. 2009. (6 Pages).

* cited by examiner

MULTITAPER SPECTRUM SENSING SYSTEMS AND METHODS

RELATED APPLICATION INFORMATION

This application claims priority to provisional application Ser. No. 61/437,164 filed on Jan. 28, 2011, incorporated herein by reference.

BACKGROUND

1. Technical Field

The present invention relates to cognitive radio and, more particularly, to spectrum sensing methods, systems and devices.

2. Description of the Related Art

The congestion and over-use of unlicensed frequency bands in many countries throughout the world has led to the development of cognitive radio techniques that permit the detection and use of licensed frequency bands in a way that does not interfere with licensed transmissions. Cognitive radio techniques are based on the concept of spectrum underutilization, in which certain licensed frequency bands are rarely utilized to its maximum potential by licensed users. Indeed, among licensed bandwidth users, there is very little usage on a very large range of spectrum in both time and space. Cognitive radio is therefore a promising solution that aims to introduce secondary, low priority usage of licensed spectrum resources while ensuring that primary usage by licensed users is not interfered with.

SUMMARY

One exemplary embodiment is directed to a method for detecting spectrum holes for use in cognitive radio secondary transmissions. In accordance with the method, an indication of an assignment of a set of subcarriers to a primary user is received. The method further includes determining multitaper spectral estimates for at least a subset of the set of subcarriers based on the assignment of the set of subcarriers to the primary user by processing samples for the at least a subset of the set of subcarriers. In addition, a test statistic that is based on the multitaper spectral estimates is compared to a threshold to determine whether the set of subcarriers is utilized for primary transmissions to the primary user. Moreover, data signals are received on at least one of the subcarriers in the set of subcarriers if the set of subcarriers is not utilized for primary transmissions to the primary user.

Another embodiment is directed to a computer readable storage medium comprising a computer readable program. The computer readable program, when executed on a computer, causes the computer to perform the method for detecting spectrum holes described above.

An alternative embodiment is directed to a secondary user receiver system for detecting spectrum holes for use in cognitive radio secondary transmissions. The system includes a mutlitaper spectral estimation (MTSE) module, a receiver and a comparator. The MTSE module is configured to receive an indication of an assignment of a set of subcarriers to a primary user and to determine multitaper spectral estimates for at least a subset of the set of subcarriers based on the assignment of the set of subcarriers to the primary user. The receiver is configured to process samples for the at least a subset of the set of subcarriers. In addition, the comparator is configured to compare a test statistic that is based on the multitaper spectral estimates to a threshold to determine whether the set of subcarriers is utilized for primary transmissions to the primary user. Moreover, the receiver is further configured to receive data signals on at least one of the subcarriers in the set of subcarriers if the set of subcarriers is not utilized for primary transmissions to the primary user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
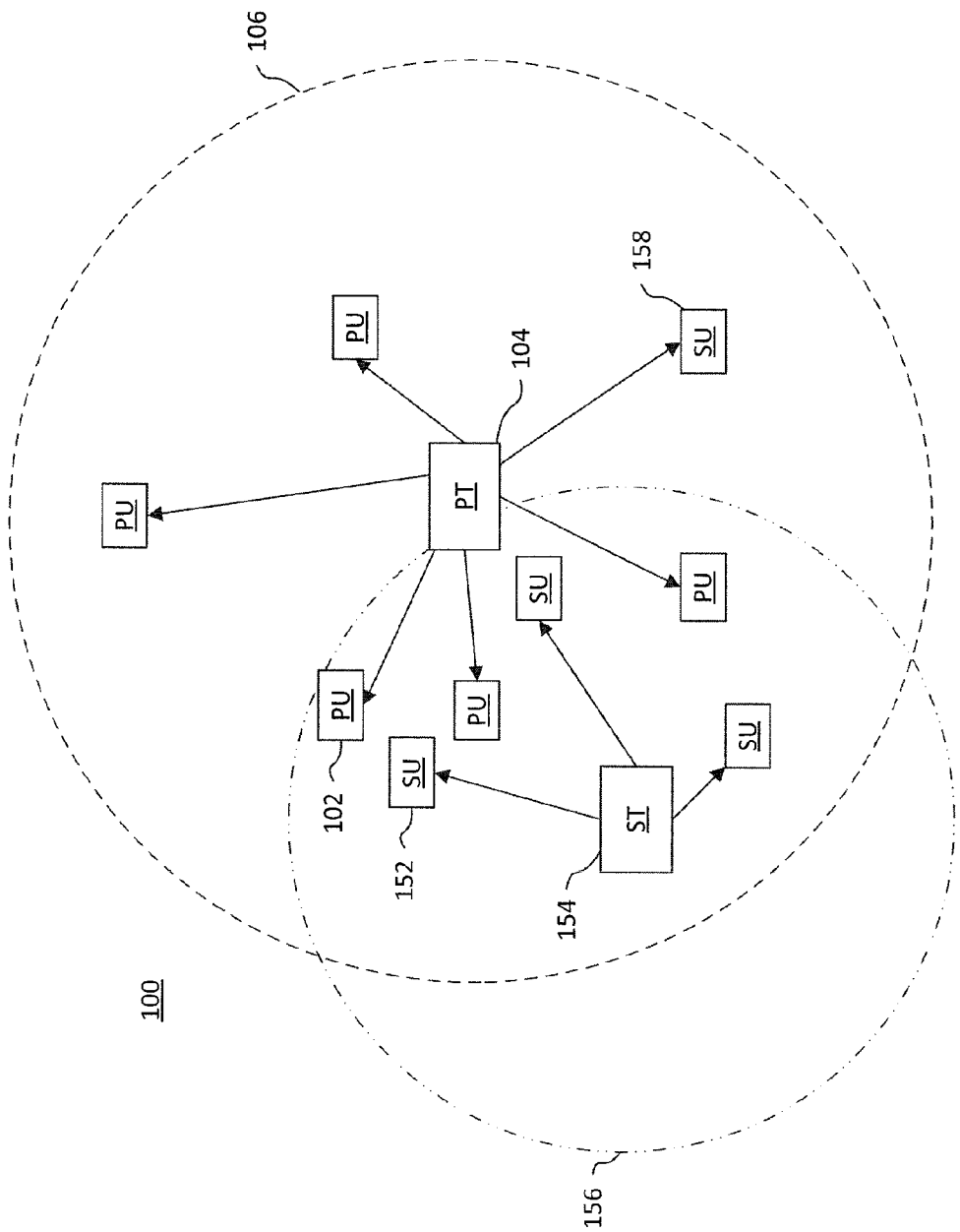
FIG. 1 is a block diagram of an exemplary communication system in which spectrum sensing embodiments can be implemented.

Embodiments of the present principles provide efficient spectrum sensing methods and systems that are capable of quickly and accurately identifying spectrum holes in various wireless environments. Embodiments apply MTSE schemes to obtain spectral estimates at certain subcarriers of interest and perform a threshold test to identify whether the carriers are occupied. MTSE is a non-parametric estimation method and the form of the estimator is determined by the data as opposed to the signal models. Thus, it is suitable for cognitive radio, which has limited knowledge about the transmitted primary signals. In accordance with exemplary aspects, a power spectrum density function of received signal samples at certain sampling points can be estimated. The problem can be formulated as detecting the presence or absence of primary users. As such, the selection of the sampling points can be dependent on subcarrier assignments to primary users. Closed form results for false alarm and miss detection probabilities of the proposed methods can be employed to select parameters for the threshold test. For example, a heuristic but effective trial-and-error method can be utilized to select design parameters for the threshold test.

The exemplary embodiments described herein below are directed to using MTSE schemes to detect spectrum holes for orthogonal frequency division multiple access (OFDMA) signals in frequency selective fading environments. In particular, the MTSE schemes leverage a priori knowledge of resource block assignments to primary users. For example, in OFDMA systems, primary user activities on a set of assigned subcarriers are strongly correlated. Thus, sensing a small part of these subcarriers can be sufficient to achieve a desirable detection performance. Using the knowledge of subcarrier assignments, MTSE-based detection of free resource blocks can be expedited by evaluating only a subset of assigned resource blocks for a primary user to determine that the entire set, or a substantial portion, of resource blocks assigned to the user are free or occupied. This aspect is especially beneficial when the number of subcarriers assigned to a PU is large, as the detection of free subcarriers using MTSE involves substantially less computational complexity than performing similar spectrum hole identification on a subcarrier-by-subcarrier basis.

It should be understood that embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As described above, the exemplary embodiments described herein are directed to OFDMA systems. However, it should be understood that the principles described herein can be applied to other systems. OFDMA systems normally support a large number of users. Each user is allocated at least one sub-channel. Sequentially scanning activities of all the PUs sub-channel by sub-channel involves prohibitively long switching delays while the use of multiple sensors (detectors) with one sensor per channel (or per user) operating simultaneously is highly complex for a large number of channels or users. Each such sensor normally employs a narrow-band band-pass filter with steep cutoffs, which introduces prohibitively high implementation/operating complexity and cost. In contrast to these schemes, the present principles utilize knowledge of the subcarrier assignments to primary systems. With this knowledge, sensing time can be significantly reduced and detection performance can be improved. Further, the present principles can employ a single wide-band receiver that is able to collect signals of interest.

Referring now in detail to the figures in which like numerals represent the same or similar elements and initially to FIG. 1, an exemplary communication system 100 is illustrated. The system 100 can include a plurality of transmitters. For example, the system can include one or more primary transmitters 104 and one or more secondary transmitters 154. The primary transmitter (PT) 104 can be configured to service and transmit data signals to primary users (PUs) 102, while the secondary transmitter (ST) 154 can be configured to service and transmit data signals to secondary users (SUs) 152. In addition, in certain exemplary implementations, the primary transmitter 104 can be configured to service one or more secondary users 158. Here, a primary transmitter and a primary user are "licensed" in the sense that they have exclusive rights to utilize and communicate on certain sets of subcarriers, denoted as primary subcarriers. In turn, second transmitters and secondary users are "unlicensed" in the sense that they have limited access to the primary subcarriers and cannot interfere with transmissions by primary transmitters or users on the primary subcarriers. It can be assumed that the activities of the primary users remain unchanged during the spectrum sensing processes described herein below.

In the embodiment illustrated in FIG. 1, the primary transmitter 104 services primary users 102 (and possibly secondary users 158) within the area 106, while the secondary transmitter 154 services secondary users 152 within the area 156, which can overlap with the area 106. The secondary transmitter 154 and/or the secondary users 152 can utilize spectrum hole detection methods described herein to determine the presence or absence of primary user 102 activity on their allocated subcarriers. In addition, in accordance with other exemplary aspects, the primary transmitter 104 can service secondary users 158 on subcarriers that it knows are unoccupied by the primary users 102 that it services. Alternatively, where the service area 106 of the primary transmitter 104 overlaps with the service area of another primary transmitter (e.g., another primary transmitter that utilizes different subcarrier bands than the primary transmitter 104), then the secondary user 158 and/or the transmitter 104 can use the detection methods to determine whether subcarriers assigned by the other primary transmitter to its primary users are free or occupied. The functions of the various elements of FIG. 1 are described in more detail herein below with respect to specific method embodiments.

Figure 2:
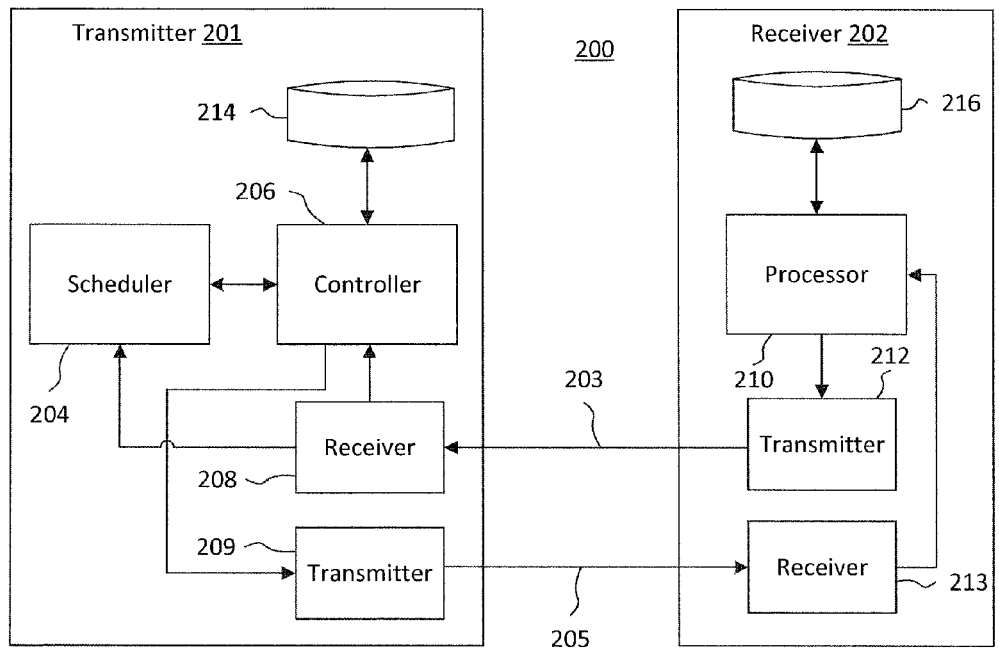
FIG. 2 is a block diagram of a transmitter and a receiver in which exemplary spectrum sensing embodiments can be implemented.

Referring to FIG. 2, with continuing reference to FIG. 1, a communication system 200 is provided to illustrate more detailed aspects of the elements of the system 100. For example, the system 200 can include a transmitter 201 that services and transmits data signals to a receiver 202. The transmitter 201 is one exemplary implementation of the transmitters 104 and 154. Similarly, the receiver 202 is one exemplary implementation of the users 152 and 158. The transmitter 201 can include a controller 206, a storage medium 214, a scheduler 204, a receiver 208 and a transmitter 209. The controller 206 can control the operations of the other elements of the transmitter 201. Here, the controller can utilize the storage medium 214 to store a program of instructions that implement one or more aspects of the spectrum sensing methods described herein. The receiver 208 can be configured to receive uplink transmission signals along the uplink 203, while the transmitter 209 can be configured to transmit downlink signals along the downlink 205. Further, the controller 206 can employ a scheduler 204 to schedule and allocate resource blocks (e.g., subcarriers) to the users/receivers that the transmitter 201 services. In turn, the receiver 202 can include a processor 210, a storage medium 216, a receiver 213 and a transmitter 212. The processor 210 can control the operations of the other elements of the receiver 202. In addition, the processor 210 can utilize the storage medium 216 to store a program of instructions that implement one or more aspects of the spectrum sensing methods described herein. The transmitter 212 can be configured to transmit uplink transmission signals along the uplink 203, while the receiver 213 can be configured to receive downlink signals along the downlink 205. The functions of the various elements of the transmitter 201 and the receiver 202 are described in more detail herein below with respect to method embodiments. However, a brief overview and description of an OFDMA system is provided to aid in the understanding of spectrum sensing methods in accordance with the present principles.

1. OFDMA System Model and Problem Formulation

To illustrate the operation of exemplary aspects of the present principles, an OFDMA system model is considered. Specifically, a downlink OFDMA-based primary system that supports maximum $N_p$ primary users 102 (indexed by $m \in \{1, \ldots, N_p\}$), which share $N_c$ subcarriers (indexed by $k \in \{1, \ldots, N_c\}$) is considered. The $N_c$ subcarriers are divided to a number of resource blocks (RBs), each of which has $N_s$ contiguous subcarriers. Let $\mathcal{A}$ be the index set of active users with $|\mathcal{A}|$ denoting its cardinality. Without loss of generality, it is assumed that the mth user is an active user, i.e., $m \in \mathcal{A}$. The information symbol stream of the mth primary user (PU) is parsed into blocks, each containing Q information symbols. Let denote the nth Q×1 such block of the mth user. The qth information symbol from this block is denoted by $S_{m,q}^{(n)}$, i.e., $S_m^{(n)} = [S_{m,1}^{(n)}, S_{m,2}^{(n)}, \ldots, S_{m,Q}^{(n)}]$. The primary signal samples $S_{m,q}^{(n)}$ are modeled as independent and identically distributed (i.i.d.) random variables (RVs) with means zero and variances $\sigma_m^2$.

Via serial-to-parallel conversion and subcarrier mapping, information symbols from $|\mathcal{A}|$ active users are fed as inputs to corresponding subcarriers of an $N_c$-point inverse fast Fourier transform (IFFT) processor. $\kappa_{m,q}$ is used to denote the subcarrier index of the qth symbol of the mth PU. Let $X^{(n)}$ be the frequency domain input vector to the IFFT, whose kth entry $X_k^{(n)}$ represents the information symbol at the kth subcarrier of the IFFT. Specifically, $X_k^{(n)}$ can be expressed as $$X_k^{(n)} = \begin{cases} S_{m,q}^{(n)} & \text{if } k = \kappa_{m,q} \text{ for some } m \in \mathcal{A} \text{ and } q \in \mathcal{Q} \\ 0 & \text{otherwise} \end{cases} \quad (1)$$

where $\mathcal{Q} = [1, \ldots, Q]$. The output vector of the IFFT is obtained as $x^{(n)} = F_{N_c}^H X^{(n)}$, where $F_{N_c}^H$ denotes the conjugate transpose of the normalized fast Fourier transform (FFT) matrix of size $N_c$. Via parallel-to-serial conversion, a cyclic prefix of length $N_g$ is appended in front of $x^{(n)}$. The ith entry of the resulting vector is given by $$x_i^{(n)} = \begin{cases} (N_c)^{-1/2} \sum_{k=1}^{N_c} X_k^{(n)} e^{\frac{j2\pi ik}{N_c}} & \text{if } -N_g + 1 \leq i \leq N_c \\ 0 & \text{otherwise.} \end{cases} \quad (2)$$

Let $x_s$ be the serialized version of the blocks $x^{(n)}$ and let $N_u$ be the total length of a transmission block, i.e., $N_u = N_g + N_c$. Specifically, $x_s$ is defined as follows $x_s := x_i^{(n)}$ where $s := nN_u + i$. Here, it is assumed that the channel between the primary transmitter and the spectrum detector at the secondary user (SU) 152 is time-invariant and frequency selective. Let $h = [h_0, \ldots, h_L]$ denote the sampled impulse response of the channel, where L denotes the channel length and $h_l$ denotes the lth channel tap. It is noted that the channel impulse response h can take into account the transmit filter, the physical channel, the receive filter, and timing error. The tth time-domain received signal sample at the spectrum detector is given as $$r_t = e^{j2\pi\delta t/N_c} \sum_{l=0}^{L} h_l x_{t-l} + w_t \quad (3)$$

where $\delta$ denotes a normalized frequency offset and $w_t$ is assumed to be additive white Gaussian noise with variance $\sigma_w^2$. Here, it is also assumed that: 1) the primary signal $x_t$ is independent of $w_t$; 2) $\delta$ is much smaller than the subcarrier spacing; 3) the channel impulse response h is perfectly known to the detector; and 4) the SU has a priori knowledge of primary system specifications, such as the central frequency, the sampling period, the subcarrier spacing and assignment, etc.

Remark 1 Assumption 3) is made primarily for deriving an exact detection performance. Without requiring an exact detection performance, partial knowledge of h, such as the statistics of the channels, is sufficient for achieving good detection performance. For certain cellular systems based on third generation partnership project (3GPP) long term evolution (LTE) or the Institute of Electrical and Electronics Engineers (IEEE) 802.16 standards, system specifications, such as the subcarrier assignment, preamble, and frame structure, are publicly available. Assumption 4) can be satisfied by exploiting such information.

During a given time period, certain PUs are not active and thus the spectrum bands allocated to these PUs become available for secondary use. Due to the assumption that users' activities are independent, a single active PU can be examined at a given time. Without loss of generality, the mth PU is considered here. Mathematically, the problem of detecting the mth PU can be formulated as a binary hypothesis testing problem as follows $$H_0: X_{\kappa_{m,q}}^{(n)} = 0, q \in \mathcal{Q}$$

$$H_1: X_{\kappa_{m,q}}^{(n)} = S_{m,q}^{(n)}, q \in \mathcal{Q}$$

Here, $H_0$ denotes the case where the subcarrier denoted by index $\kappa_{m,q}$ is free, while $H_1$ denotes the case where the subcarrier denoted by index $\kappa_{m,q}$ is used by the primary user m. However, because the set of subcarriers allocated to the primary user and the user activity in this set of carriers are strongly correlated in OFDMA systems, in certain exemplary embodiments, the entire set of subcarriers $\kappa_{m,q}$, $\forall q \in \mathcal{Q}$ allocated to the primary user at the time slot corresponding to the nth block can be assumed to be free if $H_0$ is true for some $\kappa_{m,q}$ and/or can be assumed to be occupied if $H_1$ is true for some $\kappa_{m,q}$.

2. Multitaper Spectral Estimation

To permit ease of understanding of the present principles, a brief discussion of the MTSE for a stationary stochastic process is provided and some statistical properties of MTSE are presented.

2.1 Preliminary Remarks

The multitaper spectral estimation method employs several orthogonal tapers (windows). Let $\{a_{t,p}\}_{t=1}^{N}$, p=1, ..., P be P orthogonal tapers of length N, which satisfy $$\sum_{t=1}^{N} a_{t,l} a_{t,p} = \begin{cases} 1 & \text{if } l = p \\ 0 & \text{if } l \neq p. \end{cases} \quad (4)$$

In practice, two families of orthogonal tapers, called the Slepian tapers and the sinusoidal tapers, can be used. In particular, the sinusoidal taper is given in an analytical form as $$a_{t,p} = \left(\frac{2}{N+1}\right)^{1/2} \sin\left(\frac{\pi pt}{N+1}\right) \quad (5)$$

where p=1, ..., P and t=1, ..., N. Given a stationary discrete time series $r_t$, t=1, ..., N, the pth taper spectral estimator (eigenspectra) is given by $$\hat{R}_p(f) = \left|\sum_{t=1}^{N} a_{t,p} r_t e^{-j2\pi tf}\right|^2, |f| < \frac{1}{2}. \quad (6)$$

The multitaper spectral estimator is the average of P taper spectrum estimates and is given by $$\hat{R}(f) = \frac{1}{P}\sum_{p=1}^{P} \hat{R}_p(f).$$

Let 2W be the resolution bandwidth. The parameter P can be selected to be 2NW−1 in Slepian tapers and 2W (N+1)−1 in sinusoidal tapers as follows $$P = \lfloor 2NW - 1 \rfloor \text{ (Slepian Taper)}$$

$$P = \lfloor 2(N+1)W - 1 \rfloor \text{ (Sinusoidal Taper)}$$

where $\lfloor x \rfloor$ denotes the largest integer that is less than or equal to x.

2.2 Statistical Properties of Multitaper Spectrum Estimates

In the following discussion, an assumption that the spectrum varies slowly over the interval (f−W, f+W) is made. Let R(f) denote the true power spectral density function of $r_t$. Since $\hat{R}(-f)=\hat{R}(f)$, it is sufficient to consider only f>0.

2.2.1 Mean and Variance

It can be shown that for a large N, the mean and variance of $\hat{R}(f)$ can be approximated as $$E[\hat{R}(f)] \approx R(f), \text{ and } \text{var}[\hat{R}(f)] \approx \frac{R^2(f)}{P}, 0 < f < \frac{1}{2}$$

where R(f) denotes the true power spectral density function. It can be shown that $\hat{R}(f)$ converges in distribution to $R(f)\chi_{2P}^2/$ (2P) as N approaches infinity for 0<f<½, i.e., $$\hat{R}(f) \stackrel{d}{=} \begin{cases} R(f)\chi_{2P}^2/(2P), & \text{for } 0 < f < 1/2 \\ R(f)\chi_{P}^2/P, & \text{for } f = 0 \text{ or } 1/2. \end{cases} \quad (7)$$

2.2.2 Covariance of the MTSEs at Two Distinct Frequencies

It is now further assumed that the time series $R_t$ is a realization of a Gaussian process with mean zero. Let $f_i$ and $f_j$ be two distinct frequencies. Due to the fact that the P eigenspectra $\hat{R}_p(f)$, p=1, ..., P, are uncorrelated, the covariance of $\hat{R}(f_i)$ and $\hat{R}(f_j)$ can be written as $$\text{cov}[\hat{R}(f_i), \hat{R}(f_j)] = \frac{1}{P^2} \sum_{l,p=1}^{P} \text{cov}[\hat{R}_l(f_i), \hat{R}_p(f_j)]. \quad (8)$$

It can be shown that if R(f) is slow varying over ($f_i$−W, $f_j$+W), the covariance of $\hat{R}_l(f_i)$ and $\hat{R}_p(f_j)$ can be approximated as $$\text{cov}[\hat{R}_l(f_i), \hat{R}_p(f_j)] \approx R^2(f_i) \Lambda_{l,p}(\Delta_{ij}) \quad (9)$$

where $\Delta_{ij} = f_i - f_j$ and $$\Lambda_{l,p}(\Delta_{ij}) := \left|\sum_{t=1}^{N} a_{t,l} a_{t,p} e^{j2\pi \Delta_{ij} t}\right|^2.$$

Let $\Gamma_{ij}$ be the covariance of $\hat{R}(f_i)$ and $\hat{R}(f_j)$, i.e., $\Gamma_{ij}:=\text{cov}[\hat{R}(f_i),\hat{R}(f_j)]$. From (8) and (9), we can write $\Gamma_{ij}$ as $$\Gamma_{ij} \approx \begin{cases} \dfrac{R^2(f_i)}{P^2} \sum_{l,p=1}^{P} \Lambda_{l,p}(\Delta_{ij}) & \text{if } |\Delta_{ij}| \leq 2W \\ 0 & \text{if } |\Delta_{ij}| > 2W. \end{cases} \quad (10)$$

Figure 3:
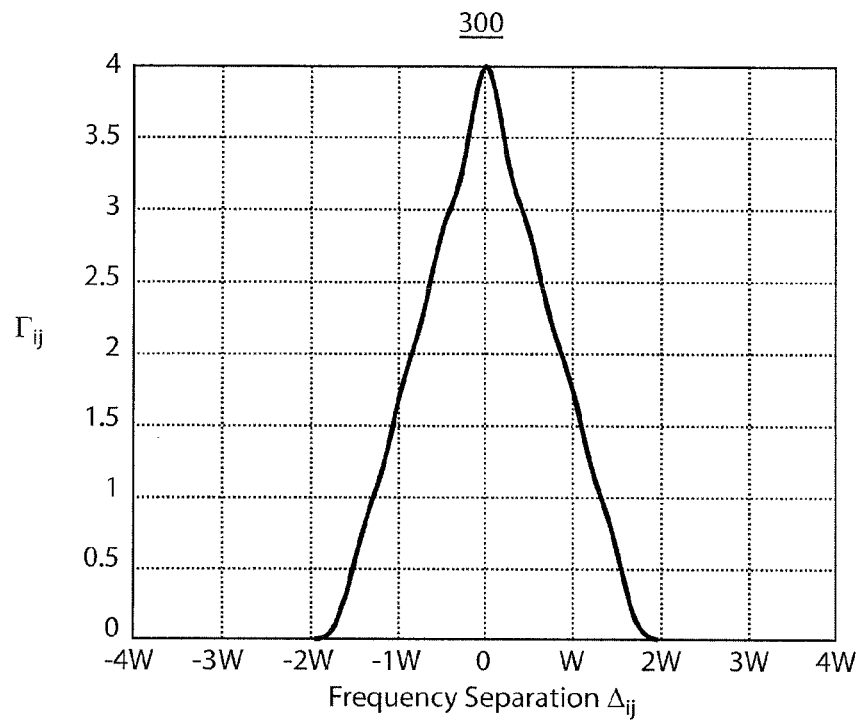
FIG. 3 is an exemplary graph depicting a dependence of the covariance of multitaper spectral estimations on frequency separations for Slepian tapers.
Figure 4:
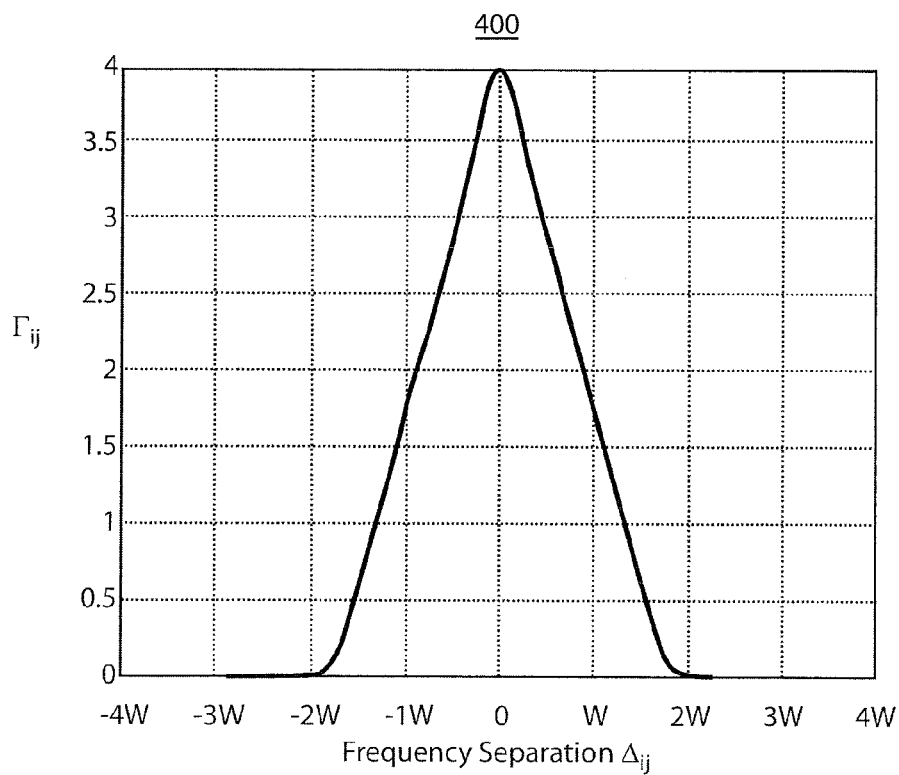
FIG. 4 is an exemplary graph depicting a dependence of the covariance of multitaper spectral estimations on frequency separations for sinusoidal tapers.

FIGS. 3 and 4 depict the covariance $\Gamma_{ij}$ versus frequency separation $\Delta_{ij}$ for Slepian tapers and sinusoidal tapers, respectively, in graphs 300 and 400. Specifically, in graph 300, for Slepian tapers, N=2048, P=4 and W=0.5(P+1)/N. In addition, in graph 400, for sinusoidal tapers, N=1024, P=4 and W=0.5 (P+1)/(N+1). As can be seen from the figures, the covariance $\Gamma_{ij}$ is approximately equal to zero when the frequency separation $\Delta_{ij}$ exceeds 2W.

It should be noted that, compared to periodogram-based methods, MTSE reduces the variance if the data tapers are properly chosen. This will lead to an improved detection performance. Further, compared with the Welch-Bartlett spectrum estimation method, MTSE employs a smaller length of data, which results in the use of a shorter sensing time.

3 MTSE Based Detection Methods

To detect the presence/absence of a PU 102, the following Multitaper spectrum estimation based Threshold Test (MTT) can be employed:

$$\mathcal{T} := \sum_{u=1}^{N_f} \hat{R}(f_u) \underset{H_0}{\overset{H_1}{\gtrless}} \eta_{th} \quad (11)$$

where $\{f_u\}_{u=1}^{N_f}$ denotes a set of sampling frequencies in the allocated spectrum of a PU 102, $N_f$ denotes the number of the sampling frequencies, and $\eta_{th}$ denotes a threshold. As stated above, the number of sampling frequencies, $N_f$, can be less than the total number of frequencies in the allocated spectrum of a PU 102, as any activity or inactivity on a subset of the allocated spectrum can be an indication that the entire allocated spectrum is free or occupied, respectively. Without loss of generality, it can be assumed that the frequencies $f_1, \ldots, f_{N_f}$ are equally spaced, and the frequency separation is denoted by $\Delta$, i.e., $|f_{u+1}-f_u|=\Delta$ for $u=1, \ldots, N_f$.

Similar to energy detection, the threshold test in (11) has a simple test statistic and performs a threshold comparison to determine whether hypothesis $H_0$ or $H_1$ is true. There are, however, some important differences between energy detection and the threshold test (11). First, the terms in the test statistic of energy detection is often assumed to be i.i.d. and the number of the terms is typically large. As a result, the central limit theorem can be applied to approximate the probability density function (PDF) of the test statistic. In the threshold test (11), the terms $\hat{R}(f_1), \ldots, \hat{R}(f_{N_f})$ are not necessarily independent and the number of these terms is not necessarily large. Thus, the PDF of the test statistic in (11) is much more complicated than that in energy detection. Secondly, for a given signal-to-noise ratio (SNR), the detection error performance of energy detection is determined by the threshold and the number of the terms in the test statistic. Besides these two parameters $\eta_{th}$ and $N_f$ in (11), the detection error performance of MTT can also be determined by the sample number N, the parameter P and the frequency separation $\Delta$. Thus, the parameters $\eta_{th}$, $N_f$, P and N should be appropriately selected such that a target false-alarm probability $\overline{P}_{FA}$ and a miss detection probability $\overline{P}_{MD}$ can be achieved. To illustrate how the selection should be made, the PDF of the test statistic $\mathcal{T}$ is evaluated herein below.

As discussed in the previous section, the spectrum estimates $\hat{R}(f_u)$ for $u=1, \ldots, N_f$ are Chi-square distributed for a large N and they are not necessarily independent. Statistically, $\mathcal{T}$ is just a sum of the correlated Chi-square RVs.

3.1 The Sum of Correlated Chi-Square Random Variables

The PDF of the sum of correlated Gamma RVs is summarized as follows. $\gamma_u$ is used here as a shorthand notation to represent $\hat{R}(f_u)$. Let R denote the $N_f \times N_f$ covariance matrix of the vector $[\gamma_1, \ldots, \gamma N_f]$ with $r_{ij}$ denoting its (i,j)th entry. By definition, $r_{ij}$ can be written as $r_{ij}=E(\gamma_i,\gamma_j)-E(\gamma_i)E(\gamma_j)$. Let C be a matrix that relates to R in the following manner $$c_{ij} = \sqrt{\frac{r_{ij}}{P}}, \quad i,j = 1, \ldots, N_f \tag{12}$$

where $c_{ij}$ is the (i, j)th entry of C. Let $\lambda_1, \ldots, \lambda_{N_e}$ denote $N_e$ distinct eigenvalues of the matrix C and let $m_1, \ldots, m_{N_e}$ denote their corresponding multipliers. Note that each $\gamma_s$ has the same shape parameter P. It can be shown that the PDF of the test statistic $\mathcal{T}$ is as follows $$f(\mathcal{T}) = \sum_{l=1}^{N_e} \sum_{r=1}^{P_{ml}} \beta_{lr} p(\mathcal{T}; l; r) \tag{13}$$

where $\beta_{lr}$ is defined as $$\text{for } r = Pm_l, \beta_{lr} = \left( \prod_{k=1, k\neq l}^{N_e} (1-s\lambda_k)^{-Pm_k} \right)\bigg|_{s=1/\lambda_l},$$

$$\text{for } 0 < r < Pm_l, \beta_{lr} = \frac{1}{(Pm_l-1)!(-\lambda_l)^{Pm_l-r}}$$

$$\frac{d^{Pm_l-r}}{ds^{Pm_l-r}} \prod_{k=1,k\neq l}^{N_e} (1-s\lambda_k)^{-Pm_l}\big|_{s=1/\lambda_l}$$

and $p(\mathcal{T}; l, r)$ is defined as $$p(\mathcal{T}; l, r) = \frac{1}{\lambda_1 \Gamma(r)} (\mathcal{T}/\lambda_1)^{r-1} e^{-\mathcal{T}/\lambda_l}.$$

In particular, when, $\gamma_1, \ldots, \gamma_{N_f-1}$ are i.i.d., we have $N_e=1$ and $m_1=N_f$. Accordingly, the PDF of $\mathcal{T}$ reduces to $$f(\mathcal{T}) = \frac{1}{\lambda_1 \Gamma(N_f P)} (\mathcal{T}/\lambda_1)^{N_f P-1} e^{-\mathcal{T}/\lambda_1}.$$

Note that in this case we have $\text{var}[r_{ii}]=R^2(f_i)/P$. Since the covariance matrix R is a diagonal matrix with the corresponding diagonal entries $\text{var}[r_{ii}]$, the matrix R is also a diagonal matrix with the diagonal entries $R(f_i)/P$ as given by (12).

3.2 The False-Alarm Probability

Under $H_0$, the detector observes additive white Gaussian noise $w_t$. Hence, the true power spectral density R(f) is constant and is equal to $\sigma_w^2$. According to (10) and (12), $c_{ij}$ is obtained as $$c_{ij} = \begin{cases} \frac{\sigma_w^2}{P} \sqrt{\frac{\sum_{l,p=1}^{N} \Lambda_{l,p}(D_{ij})}{P}}, & \text{if } D_{ij} \leq 2W \\ 0, & \text{if } D_{ij} > 2W \end{cases} \tag{14}$$

where $D_{ij}:=|i-j|\Delta$. In particular, the diagonal entries of matrix C are given by $c_{ii}=\sigma_w^2/P$ as $$\sum_{l,p=1}^{N} \Lambda_{l,p}(0) = P.$$

The false alarm probability is defined as the probability of the event that a PU is determined to be active while actually the PU is inactive. Mathematically, the false alarm probability is given by $$P_{FA} = P(\mathcal{T} > \eta_{th} | H_0) = \int_{\eta_{th}}^{\infty} f(\mathcal{T}|H_0)d\mathcal{T}. \tag{15}$$

According to (13), the following result on the false-alarm probability is obtained.

Proposition 1 The false alarm probability $P_{FA}$ is given by $$P_{FA} = \sum_{l=1}^{N_e} \sum_{r=1}^{Pm_l} \beta_{lr} \frac{\Gamma(r, \eta_{th}/\lambda_1)}{\Gamma(r)} \quad (16)$$

where $\Gamma(\cdot,\cdot)$ denotes the upper incomplete Gamma function, i.e., $\Gamma(s,x)$ is defined as $$\Gamma(s,x) = \int_x^\infty t^{s-1} e^{-t} dt,$$

$\Gamma(\cdot)$ denotes the Gamma function, and $N_e$, $m_l$ and $\lambda_l$ are the corresponding parameters for the matrix C given in (14). In particular, if $\hat{R}(f_1), \ldots, \hat{R}(f_s)$ are i.i.d., then $P_{FA}$ is given by $$P_{FA} = \frac{\Gamma(N_f P, \eta_{th}/\lambda_1)}{(N_f P - 1)!} \quad (17)$$

and for given $N_f$, $P$ and $P_{FA}$, the threshold can be determined as $$\eta_{th} = \Gamma^{-1}(N_f P, P_{FA}(N_f P - 1)!) \lambda_1$$

where $\Gamma^{-1}$ denotes the inverse of the incomplete Gamma function $\Gamma(s,x)$ with respect to the second parameter x.

In general, for given $N_f$, $P$, and $P_{FA}$ the threshold $\eta_{th}$ can be obtained by evaluating (16) numerically based on a trial and error method, as described in more detail herein below.

3.3 The Miss Detection Probability

The miss detection probability can be computed as follows. Under $H_1$, the received signal samples in (3) can be rewritten as $$r_t = \sum_{l=0}^{L} h_l u_{t-l} + w_t,$$

where $u_t := x_t e^{j2\pi\delta t/N_c}$. Recall that $S_{m,1}^{(n)}, \ldots, S_{m,Q}^{(n)}$ are i.i.d. RVs. Since Q is relatively large in practice, the transmitted signal samples $\chi_t$ can be approximately modeled by a Gaussian random process. Since a linear transform of a Gaussian process is still a Gaussian process, the received samples $r_t$ can also be approximated and treated as a realization of a Gaussian process. Therefore, the results on the covariance of the MTSE between two distinct frequencies in Section 2, above, hold. According to (10), the true power spectrum density (PSD), R(f), should be obtained in order to compute an approximation of the covariance $c_{ij}$. This, however, is generally infeasible in practice. Here, the unbiased property of the MTSE, i.e., $E[\hat{R}(f)] = R(f)$, can be used to obtain the true R(f) and to compute $c_{ij}$. First, $\hat{R}(f)$ can be cast into another form to facilitate the computation of $E[\hat{R}(f)]$. Therefore, the (i, j)th entry of C is given as follows $$c_{ij} = \begin{cases} \frac{E[\hat{R}(f)]}{P} \sqrt{\frac{\sum_{l,p=1}^{N} \Lambda_{l,p}(D_{ij})}{P}}, & \text{if } D_{ij} \leq 2W \\ 0, & \text{if } D_{ij} > 2W. \end{cases} \quad (18)$$

The pth MTSE of the received signal samples $r_t$ under $H_1$ is expressed as follows $$\hat{R}_p(f) = \left| \sum_{t=1}^{N} a_{t,p} \left( \sum_{l=0}^{L} h_l u_{t-l} + w_t \right) e^{-j2\pi tf} \right|^2 \quad (19)$$

$$= \left| \sum_{t=1}^{N} \sum_{l=0}^{L} a_{t,p} h_l u_{t-l} e^{-j2\pi tf} + \sum_{t=1}^{N} a_{t,p} w_t e^{-j2\pi tf} \right|^2$$

$$= \left| \sum_{l=0}^{L} h_l \sum_{t=1}^{N} a_{t,p} h_l u_{t-l} e^{-j2\pi tf} + \sum_{t=1}^{N} a_{t,p} w_t e^{-j2\pi tf} \right|^2$$

$$= \left| \sum_{l=0}^{L} h_l X_{p,l}(f) + W_p(f) \right|^2 \quad (20)$$

where $$X_{p,l}(f) := \sum_{t=1}^{N} a_{t,p} u_{t-l} e^{-j2\pi tf} \text{ and } W_p(f) := \sum_{t=1}^{N} a_{t,p} w_t e^{-j2\pi tf}.$$

Using the fact that $X_{p,l}(f)$ and $W_p(f)$ are independent, $E_1[\hat{R}_p(f)]$ can be written as $$E_1[\hat{R}_p(f)] = E_1 \left[ \left| \sum_{l=0}^{L} h_l X_{p,l}(f) \right|^2 \right] + E_1[|W_p(f)|^2]. \quad (21)$$

Clearly, we have $E_1[|W_p(f)|^2] = \sigma_w^2$ where $E_1[\cdot]$ denotes the conditional expectation under $H_1$. Furthermore, we have $$E_1 \left[ \left| \sum_{l=0}^{L} h_l X_{p,l}(f) \right|^2 \right] = \sum_{l_1,l_2=0}^{L} h_{l_1} h_{l_2}^* E_1[X_{p,l_1}(f) X_{p,l_2}^*(f)]. \quad (22)$$

Let $\sigma_k^2$ be the transmitted signal power at subcarrier k, i.e., $\sigma_k^2 = \sigma_m^2$ if $k = \kappa_{m,q}$ for some $m \in A$ and $q \in 1, \ldots, Q$ and $\sigma_k^2 = 0$ otherwise. Under certain assumptions, the following results on $$E_1 \left[ \left| \sum_{l=0}^{L} h_l X_{p,l}(f) \right|^2 \right]$$

can be obtained.

Proposition 2 If N is a multiple of $N_c$, i.e., $N = N_l N_c$ with $N_l$ denoting a positive integer, then $$E_1 \left[ \left| \sum_{l=0}^{L} h_l X_{p,l}(f) \right|^2 \right] = \sum_{l_1,l_2=0}^{L} h_{l_1} h_{l_2}^* \sum_{k=1}^{N_c} \sigma_k^2 e^{j\frac{2\pi k(l_1-l_2)}{N_c}} \sum_{s=0}^{N_l-1} A_{k,s}(f;p) \quad (23)$$

where $$A_{k,s}(f; p) = \left| \sum_{i=1}^{N_c} a_{sN_c+i,p} e^{-j2\pi\zeta_k i} \right|^2$$

with $\zeta_k$ denoting $f-k/N_c$.

Lemma 1 For sinusoidal tapers, $A_{k,s}(f)$ is given by $$A_{k,s}(f; p) = \qquad (24)$$

$$\frac{1}{2(N+1)} \left| \Xi_{s,p} \frac{\sin(\pi(V_p/2 - \zeta_k)N_c)}{\sin(\pi(V_p/2 - \zeta_k))} - \Xi_{s,p}^* \frac{\sin(\pi(V_p/2 + \zeta_k)N_c)}{\sin(\pi(V_p/2 + \zeta_k))} \right|^2$$

where $$\Xi_{s,p} := e^{j\pi U_{s,p}} e^{j\pi V_p(N_c+1)/2}$$

with $U_{s,p}:=psN_c/(N+1)$ and $V_p:=p/(N+1)$.

Corollary 1 For sinusoidal tapers, if $N_c$ is less than or equal to ½W, and N is a multiple of $N_c$ and is much larger than $N_c$, i.e., $N_l \gg 1$ then $$E_1\left[ \left| \sum_{l=0}^{L} h_l X_{p,l}(f) \right|^2 \right] \approx \qquad (25)$$

$$\frac{N_l}{N+1} \sum_{l_1,l_2=0}^{L} h_{l_1} h_{l_2}^* \sum_{k=1}^{N_c} \sigma_k^2 e^{j2\pi k \frac{l_1-l_2}{N_c}} \left| \frac{\sin(\pi\zeta_k N_c)}{\sin(\pi\zeta_k)} \right|^2.$$

In particular, if $f=k_0/N_c$ for some $k_0 \in \{1, \ldots, N_c\}$, $$E_1\left[ \left| \sum_{l=0}^{L} h_l X_{p,l}\left(\frac{k_0}{N_c}\right) \right|^2 \right] \approx \sigma_{k_0}^2 \left| H\left(\frac{k_0}{N_c}\right) \right|^2 \qquad (26)$$

where $$H(f) := \sum_{l=0}^{L} h_l e^{j2\pi l f}.$$

Remark 2 Lemma 1 and Corollary 1 hold only for sinusoidal tapers. For Slepian tapers, it is difficult to obtain an analytical form of $A_{k,s}(f;p)$ and an analytical expression of $$E_1\left( \left| \sum_{l=0}^{L} h_l X_{p,l}(f) \right|^2 \right).$$

However, via simulation, a similar result to the one in (26) can be observed.

Because $$E_1(\hat{R}(f)) = \sum_{p=1}^{P} E_1(\hat{R}_p(f))/P \text{ and } R(f) \approx E_1(\hat{R}(f))$$

for a large N, R(f) can be approximated by applying (21) and Proposition 2. Accordingly, the matrix C can be obtained by computing (10) and (12). In particular, if N is a multiple of $N_c$ and is much larger than $N_c$, i.e., $N_l \gg 1$, then $E_1(\hat{R}_p(i/N_c)) \approx \sigma_i^2 |H(i/N_c)|^2 + \sigma_w^2$, which is independent of the taper index p for any $i \in 1, \ldots, N_c$. Because $E_1(\hat{R}(i/N_c))=E_1(\hat{R}_p(i/N_c))$ and $E_1(\hat{R}(i/N_c)) \approx R(i/N_c)$, we have $R(i/N_c) \approx \sigma_{k_0}^2 |H(i/N_c)|^2 + \sigma_w^2$. In practice, the frequency response $H(i/N_c)$ can be approximated as a constant over a resource block (RB). Thus, it is reasonable to assume that $H(i/N_c)$ remains constant over a frequency interval 2W, which is typically much smaller than the bandwidth of an RB. According to (10) and (12), $c_{ij}$ is given by $$c_{ij} = \begin{cases} \frac{\sigma_i^2 |H(i/N_c)|^2 + \sigma_w^2}{P} \sqrt{\frac{\sum_{l,p=1}^{N} \Lambda_{l,p}(D_{ij})}{P}}, & \text{if } D_{ij} \leq 2W \\ 0, & \text{if } D_{ij} > 2W. \end{cases} \qquad (27)$$

where i, $j \in \{1, \ldots, N_f\}$ with $N_f \leq_c$. In particular, the diagonal entries $c_{ii}$ are given by $c_{ii} = (\sigma_i^2 |H(i/N_c)|^2 + \sigma_w^2)/P$. The miss detection probability is defined as the probability of the event that a PU is determined to be inactive while actually the PU is active. Mathematically, the miss detection probability is given by $$P_{MD} = P(\mathcal{T} < \eta_{th} | H_1) = \int_0^{\eta_{th}} f(\mathcal{T} | H_1) d\mathcal{T}$$

Proposition 3 The miss detection probability $P_{MD}$ is given by $$P_{MD} = \sum_{l=1}^{N_e} \sum_{r=1}^{Pm_l} \beta_{lr} \int_0^{\eta_{th}} p(\mathcal{T}; l, r) d\mathcal{T} = \sum_{l=1}^{N_e} \sum_{r=1}^{Pm_l} \beta_{lr} \frac{\gamma\left(r, \frac{\eta_{th}}{\lambda_1}\right)}{\Gamma(r)} \qquad (28)$$

where $\gamma(\bullet,\bullet)$ denotes the lower incomplete gamma function, i.e., $\gamma(s,x)$ is defined as $$\gamma(s, x) = \int_0^x t^{s-1} e^{-t} dt,$$

and $N_e$, $m_l$ and $\lambda_l$ are the corresponding parameters for the matrix C given in (18).

4.4 A Heuristic Method for Selecting N, P, $N_f$ and $\eta_{th}$

Unlike energy detection, MTT can depend on several parameters, such as N, P, $N_f$ and $\eta_{th}$. In MTT, selecting an appropriate set of parameters to meet desirable target false-alarm and miss detection probabilities is challenging. However, an effective heuristic method can be applied as follows to determine the parameters N, P, $N_f$ and $\eta_{th}$.

Figure 5:
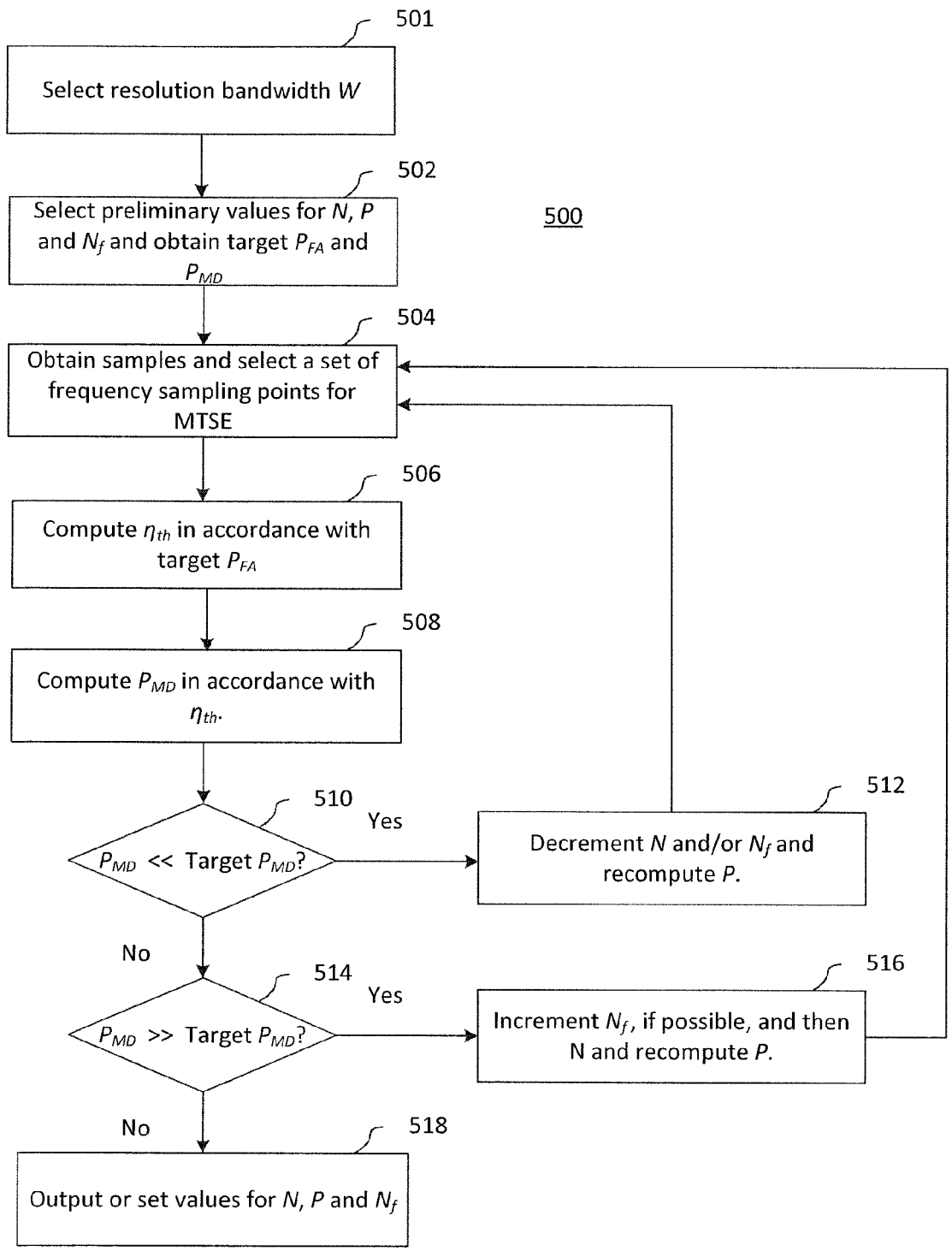
FIG. 5 is a block/flow diagram of a method for determining test statistic parameters in accordance with an exemplary embodiment.

Referring now to FIG. 5, with continuing reference to FIGS. 1 and 2, a method 500 for determining test statistic parameters in accordance with one exemplary embodiment is illustrated. It should be noted that the method 500 can be made offline to select the test statistic parameters and can be performed by a processor 210 of a secondary user 152/156. It should be noted that "offline" should be understood to mean that the determination of the test statistic parameters is performed before spectrum sensing is performed.

The method 500 can begin at step 501, at which the processor 210 of the secondary user 152/156 can select a resolution bandwidth W. Typically, the resolution bandwidth is less than the subcarrier spacing. However, in a typical OFDMA system, each user is allocated a number of resource blocks. Each resource block consists of several consecutive subcarriers. Because all these consecutive subcarriers belong to or is assigned to one PU, the subcarriers need not be distinguished. For example, if a PU is assigned subcarriers 1-10, for detection purposes, subcarrier activities in resource blocks 1-10 need not be distinguished. In other words, the resolution bandwidth W can be selected such that it is larger than the subcarrier spacing. In general, selecting the resolution bandwidth in this manner can improve detection time efficiency without affecting the accuracy of detection results. However, there is a potential problem for subcarriers on the edges. For example, if W=2*(subcarrier spacing) is chosen, the MTSE on subcarrier 10 can be affected by subcarrier 11, which is assigned to another PU. This can lead to detection errors. In this case, MTSE, described herein below, can be performed at subcarriers 2-9 for detection purposes, while still retaining the selection of W=2*(subcarrier spacing). By doing so, MTSE at subcarriers 2-9 may suffer from power leakage from other users. As such, the selection of W can be implemented in a heuristic manner by taking these factors into consideration. The selection of the value of W can also depend on the choice of the subsets $N_f$ of the subcarriers for detection. Selecting a resolution bandwidth W that is larger than the subcarrier spacing can improve detection efficiency, as a larger resolution bandwidth W leads to a smaller total number of samples N for a fixed P.

At step 502, preliminary values for N, P and $N_f$ can be selected as an initial guess. For example, a processor 210 of a secondary user 152/156 can select the preliminary values for N, P, and $N_f$. The preliminary values can be pre-determined and stored on the storage medium 216. Further, the preliminary values can also be selected based on empirical experience. Moreover, the processor 210 can also obtain target values for the false-alarm probability $P_{FA}$ and the miss detection probability $P_{MD}$, respectively. These target values can be pre-stored in the storage medium 216 or can be received from the transmitter 201 on-the-fly.

At step 504, the processor 210 can obtain samples and can select a set of frequency sampling points on which to perform the method. For example, the processor 210 can measure or can obtain an indication of the noise $w_t$ from samples t taken in the time domain in accordance with the selected value of N. For example, the processor 210 can measure the noise power. In addition, the processor 210 can estimate the channel between the primary transmitter 201 and the receiver 202. Furthermore, the set of frequency sampling points chosen for evaluation here can be a given set of frequencies or subcarriers $\{f_u\}_{u=1}^{N_f}$ that is selected from a set of frequencies or subcarriers. The set of frequencies can correspond to subcarriers that are assigned to a primary user. As described herein below, the PU subcarrier assignment can be obtained, for example, from the transmitter 201. Further, the $N_f$ frequencies chosen from a PU assignment should have relatively large frequency separations. For example, if a PU is assigned to subcarriers 1-5 and 21-25, where consecutive subcarrier indices correspond to consecutive subcarrier frequencies, and $N_f=4$, the processor 210 can choose subcarriers with indices 1, 5, 21 and 25. The processor 201 chooses subcarriers that are spanned out along the frequency band, as larger frequency separations lead to a higher frequency diversity, which potentially improves the accuracy of the spectrum sensing results.

At step 506, the threshold $n_{th}$ can be computed. For example, the processor 210 can determine the threshold $n_{th}$ from (16) by computing $\eta_{th}=\delta^{-1}(N_f,P,P_{FA}(N_fP-1)!)\lambda_l$ using the values for N, P, and $N_f$ selected at step 502 (or steps 512/516), the target false alarm probability $P_{FA}$ and the measurements obtained at step 504.

At step 508, the miss detection probability $P_{MD}$ can be determined by employing the threshold $\eta_{th}$ obtained at step 506. For example, the processor 210 can compute the probability $P_{MD}$ from (28) using the obtained threshold $\eta_{th}$.

At step 510, a determination of whether the miss detection probability $P_{MD}$ obtained at step 508 is substantially smaller than the target miss detection probability, $\bar{P}_{MD}$, can be made. For example, if the error between the real miss detection probability and the target miss detection probability is within a certain acceptable percentage range, depending on design specifications, the design parameters are considered to be acceptable. For example, if $|P_{MD}-\bar{P}_{MD}|<\alpha\bar{P}_{MD}$, where is $\alpha$ is a design parameter and is much smaller than 1, e.g., $\alpha=10\%$, then N, P, and $N_f$ can be deemed acceptable. Thus, the miss detection probability $P_{MD}$ obtained at step 508 can be deemed to be substantially smaller than the target miss detection probability if, for example, the obtained miss detection probability is less than the target miss detection probability and is not at least 10% of the target probability. Here, the percentage can be based on design choice. If the miss detection probability $P_{MD}$ obtained at step 508 is determined to be substantially smaller than the target miss detection probability, then the processor 210 can decrement each the values of N and/or $N_f$ in this order at step 512 and can repeat steps 504-510 with these values. In accordance with one implementation, the parameter P at step 512 can be obtained based on the (new) value of N. For example, as noted above, for Slepian tapers, the total number of orthogonal tapers P can be determined by computing $P=\lfloor 2NW-1\rfloor$. Alternatively, for sinusoidal tapers, P can be determined by computing $P=\lfloor 2(N+1)W-1\rfloor$. As stated above, $\lfloor x \rfloor$ denotes the largest integer less than or equal to x. Because the parameter W is fixed, a decrease in the values of N implies a decrease or non-increase in the values of P. If the miss detection probability $P_{MD}$ obtained at step 508 is determined to be not substantially smaller than the target miss detection probability, the method can proceed to step 514.

At step 514, a determination of whether the miss detection probability $P_{MD}$ obtained at step 508 is substantially larger than the target miss detection probability is made. For example, the miss detection probability $P_{MD}$ obtained at step 508 can be deemed to be substantially larger than the target miss detection probability if the obtained miss detection probability is larger than the target miss detection probability and is not within at least 10% of the target probability. As noted above, the percentage can be based on design choice. If the miss detection probability $P_{MD}$ obtained at step 508 is determined to be substantially larger than the target miss detection probability, then the processor 210 can increment the value of $N_f$, if possible, and then N in this order at step 516 and can repeat steps 504-510 with these values. It should be noted that the value of $N_f$ is less than or equal to the number of subcarriers Q allocated to the primary user of interest and is thus not incremented when it is set to Q. In this case, only N is incremented. As described above with respect to step 512, the parameter P, at step 516, can be obtained based on the (new) value of N for fixed W. For example, the parameter P can be computed based in the relationship between N and P described above with respect to Slepian or sinusoidal tapers. Because W is fixed, an increase in the value of N implies an increase or non-decrease in the value of P. If the miss detection probability $P_{MD}$ obtained at step 508 is determined to be not substantially larger than the target miss detection probability, the method can proceed to step 518, at which the processor 210 can output or set the values of N, P and $N_f$ that were most recently used to compute the threshold $n_{th}$ and the $P_{MD}$ at steps 506 and 508, respectively. As noted above, P can be computed based on the value of N.

It should be understood that the method 500 can be repeated for other sets of frequency sampling points so that the test statistic parameters can be tailored to the specific set of subcarriers that are to be subsequently evaluated for spectrum holes. It should be further understood that although the method 500 has been described as being performed by the processor 210, the controller 206 of the transmitter 201 can be configured to perform the method 500. For example, the processor 210 can perform the measurements described above with respect to step 504 and can transmit indications of these measurements along the uplink 203 to the transmitter 201. In turn, the controller 206 can perform the method 500 as described above to obtain the values of the test statistic parameters.

4.5 Detailed System and Method for Detecting Spectrum Holes

Figure 6:
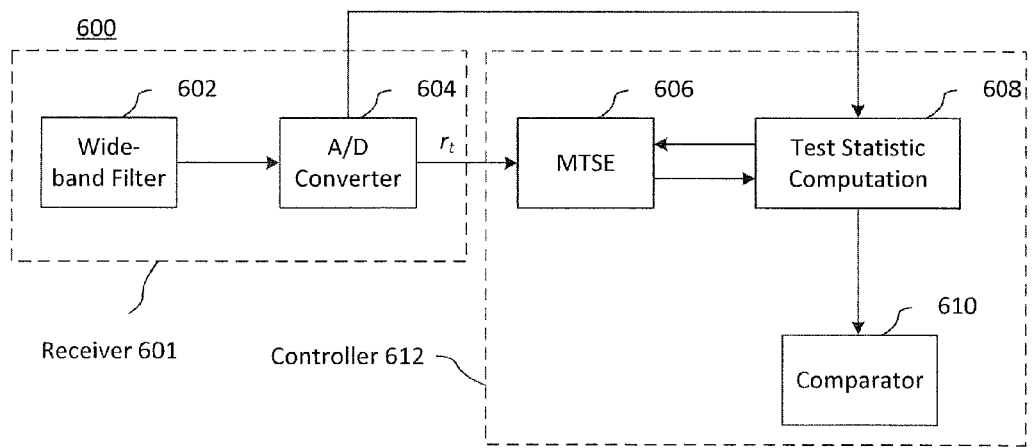
FIG. 6 is a block/flow diagram of a receiver system for detecting spectrum holes in accordance with an exemplary embodiment.

Referring now to FIG. 6, with continuing reference to FIGS. 1, 2 and 5, an exemplary system 600 for detecting spectrum holes for use in cognitive radio secondary transmissions is illustratively depicted. The system 600 can include a receiver 601 and a controller 612. The receiver 601 can include a filter 602 and an analogue to digital converter 604 to receive and process signals. In addition, the controller 612 can include an MTSE module 606, a Test Statistic Computation Module 608 and a Comparator 610. The elements of the system 600 are described in more detail herein below with respect to a detailed method embodiment for detecting spectrum holes. However, it should be understood that the receiver 601 can be an implementation of the receiver 213 of the receiver system 202. In addition, the controller 612 can be implemented by the processor 210, or by the processor 210 and the storage medium 216 if one or more of the modules are implemented using software, of the receiver system 202. In alternative embodiments, the controller 612 can be implemented by the controller 206, or by the controller 206 and the storage medium 214 if one or more of the elements of the controller 612 are implemented using software, of the transmitter system 201, as described in more detail herein below.

Figure 7:
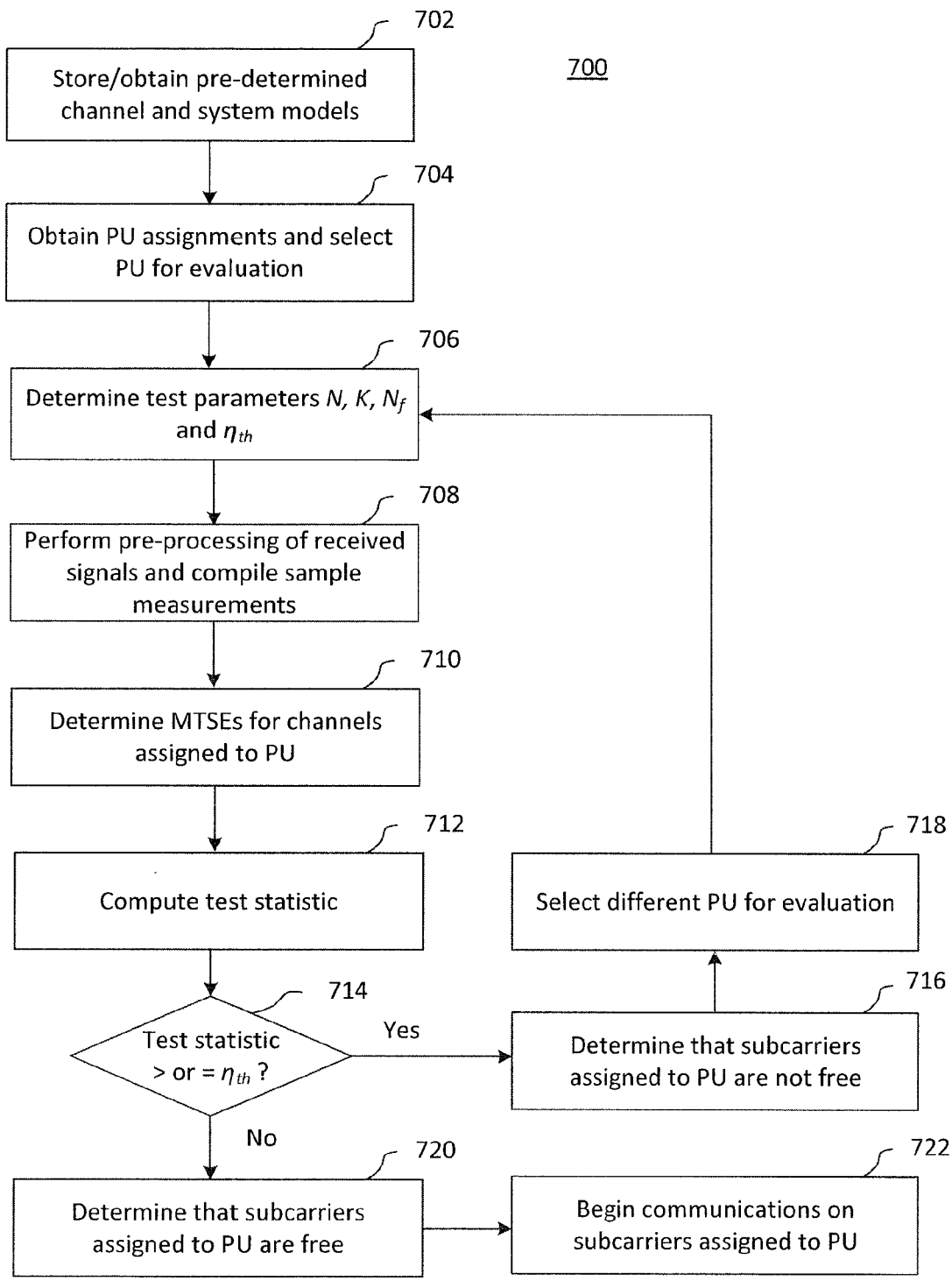
FIG. 7 is a block/flow diagram of a method for detecting spectrum holes in accordance with an exemplary embodiment.

Referring now to FIG. 7, with continuing reference to FIGS. 1, 2, 5 and 6, a method 700 for detecting spectrum holes for use in cognitive radio secondary transmissions in accordance with an exemplary embodiment is illustratively depicted. The method 700 can begin at step 702, at which pre-determined channel and system models can be obtained by the controller 612 and/or stored in the storage medium 216. For example, the channel model can be the channel impulse response model h for each frequency or subcarrier. As indicated above, the channel impulse response model h can be based on a transmit filter in the transmitter 209, the physical channel or subcarrier under analysis, the receive filter 602 and timing error. Moreover, the system model can be based on the system specifications of the primary users 102 and transmitters 104. For example, such system specifications can include the central frequency, the sampling period, the subcarrier spacing and the frame structure.

At step 704, the MTSE module 606 can obtain indications of primary user subcarrier assignments and can select a primary user's assignment for evaluation. For example, the receiver 601 can receive the indications of primary user assignments from the transmitter 201 and can provide the indications to the MTSE module 606.

At step 706, the test statistic computation module 608 can determine the test parameters N, P, $N_f$ and $\eta_{th}$. Here, the test statistic computation module can perform the method 500 to implement step 706. For example, the test statistic computation module 608 can determine the total number of samples N taken in the time domain, the total number of orthogonal tapers P applied to the N samples, the total number of frequencies $N_f$ evaluated for MTSE and the threshold $\eta_{th}$ as described above with respect to the heuristic method 500. Further, as described above with respect to the method 500, the determination of the test parameters N, P and $N_f$ can be made based on a pre-determined target false alarm probability $\overline{P}_{FA}$ and a pre-determined target miss detection probability $\overline{P}_{MD}$. In addition, as described above, the determination of the threshold $\eta_{th}$ in the heuristic method 500 can be made based on the test parameters N, P and $N_f$.

At step 708, the receiver 601 can perform pre-processing of received signals and can compile sample measurements. For example, the MTSE module 606 can be configured to direct the receiver 601 to perform sampling. Here, the received signal waveforms can pass through the filter 602, which can be a wide-band filter, and can subsequently pass through an analogue-to-digital converter 604. The filter 602 removes out-of-band noise and the analogue-to-digital converter 604 converts the continuous-time waveform into discrete-time signals. The detector described here need not use multiple sensors for each channel, as the method 700 can be implemented with a single wide-band filter. The analogue-to-digital converter 604 outputs a sequence of the received signal samples, denoted by $r_t$, which are in turn compiled by the MTSE module 606. The MTSE module 606 can compile a set of N samples as described above. It should be noted that, in accordance with one exemplary aspect, the processing of signals to obtain samples need not be performed here at step 708. For example, the samples can be compiled from samples taken at step 504 in the method 500. The taking of samples at step 504 can be performed in the same manner described here.

At step 710, the MTSE module 606 can determine multitaper spectral estimates for channels assigned to the primary user. For example, MTSE module 606 can determine multitaper spectral estimates for the $N_f$ frequencies or subcarriers assigned to the primary user as described above. As stated above, the total number $N_f$ of frequencies or subcarriers evaluated can be less than the total number of frequencies assigned to the primary user to expedite the detection of spectrum holes. Further, the $N_f$ frequencies chosen from a PU assignment should have relatively large frequency separations, as described above with respect to step 504. In accordance with one exemplary aspect, the MTSE module 606 can apply a plurality orthogonal tapers $\{\alpha_{t,p}\}_{t=1}^{N}$, p=1, ..., P, to the set of samples compiled to obtain P taper spectral estimators $\hat{R}_p(f)$ in accordance with (6), $$\hat{R}_p(f) = \left| \sum_{t=1}^{N} a_{t,p} r_t e^{-j2\pi tf} \right|^2.$$

To obtain a multitaper spectral estimate $\hat{R}(f)$ for each frequency or subcarrier f of the $N_f$ frequencies or subcarriers, the MTSE module 606 can compute the averages of taper estimators. For example, as noted above, the MTSE module 606 can apply $$\hat{R}(f) = \frac{1}{P}\sum_{p=1}^{P} \hat{R}_p(f)$$

to determine a multitaper spectral estimate for a given subcarrier f in the set of subcarriers $\{f_u\}_{u=1}^{N_f}$.

At step 714, the comparator 610 can compare the multitaper spectral estimates to a threshold to determine whether the set of subcarriers assigned to the primary user are utilized for primary transmissions to the primary user. For example, the comparator can compare the multitaper spectral estimates $\hat{R}(f)$, $\{f_u\}_{u=1}^{N_f}$, to the threshold $\eta_{th}$ computed at step 706. For example, the test statistic computation module 608 can, at step 712, compute a test statistic, $\mathcal{T}$, by determining a sum of the multitaper spectral estimates, $$\mathcal{T} := \sum_{u=1}^{N_f} \hat{R}(f_u),$$

as described above. In addition, at step 714, the comparator 610 can compare the test statistic $\mathcal{T}$ to the threshold $\eta_{th}$ to determine whether the threshold is greater than or equal to the test statistic. If the test statistic is greater than or equal to the threshold, then the method can proceed to step 716, at which the controller 612 determines that the set of subcarriers assigned to the PU are not free. For example, as noted above, in accordance with one implementation, a determination of whether the entire set of subcarriers assigned to a PU is active can be made based on an evaluation of only a subset of such subcarriers due to the strong correlation between the subcarriers in an OFDMA system. For example, as indicated above, a determination of whether the entire set of subcarriers assigned to a PU is active can be made based on multispectral estimates for only the subcarriers $\{f_u\}_{u=1}^{N_f}$, which can be a subset of the subcarriers assigned to the PU. After determining that the set of subcarriers assigned to the PU are not free at step 716, the controller 612 can select, at step 718, a different PU for evaluation and the method can proceed to step 706 and can be repeated. For example, steps 706-712 can be performed for the set of subcarriers assigned to the different PU. The assignment, as noted above, can be obtained previously at step 704. The process can be repeated for new PUs until the test statistic for a given PU is less than the threshold. Thus, returning to step 714, if the test statistic is less than the threshold, then the method can proceed to step 720, at which the controller 612 determines that the set of subcarriers assigned to the PU, for which the test statistic is determined at step 714, is not utilized for primary transmissions to the primary user. The method can proceed to step 722, at which the receiver system 600 begins communications on one or more of the subcarriers assigned to the PU. For example, the processor 210, which can implement the controller 612, as discussed above, can direct the transmitter 212 to transmit an indication that the set of subcarriers assigned to the primary user is free. In addition, the controller 206 can select one or more of the subcarriers in the set of subcarriers assigned to the primary user and can input the selection to its scheduler 204. In turn, the controller 206 can direct its transmitter 209 to transmit an indication of the selected subcarriers and can transmit data signals on the selected subcarriers, which can be received and processed by the receiver 600.

It should be noted that although the method 700 has been described as being performed primarily by the receiver system 600, the method 700 can be modified such that its steps are performed by the transmitter system 201. For example, the controller 206 can determine the test parameters at step 706 by performing the method 500, as described above. In addition, the transmitter system 201 can obtain the PU assignments from a primary transmitter 104 through a separate network, such as the Internet, that includes wired and/or wireless components. Moreover, the receiver 202 can perform the processing of received signals and can compile sample measurements at step 708, as described above. However, here, the receiver 202 can transmit indications of the sample measurements to the transmitter 201, which can employ the controller 206 to perform steps 710-718 as described above to determine which subcarriers are free by using the sample measurements. Thereafter, the transmitter 201 can implement step 722 by transmitting to the receiver 202 indications of the subcarriers on which data will be transmitted to the receiver and can transmit data signals to the receiver 202 on such subcarriers.

Having described preferred embodiments multitaper spectrum sensing systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting spectrum holes for use in cognitive radio secondary transmissions comprising:
  receiving an indication of an assignment of a set of subcarriers to a primary user;
  obtaining a set of samples;
  determining multitaper spectral estimates for at least a subset of the set of subcarriers based on the assignment of the set of subcarriers to the primary user by processing samples of the set of samples for the at least a subset of the set of subcarriers and by applying a set of orthogonal tapers to the set of samples to obtain taper spectral estimators for each subcarrier in the at least a subset of the set of subcarriers;
  determining a total number of samples that is obtained by said obtaining a set of samples, a total number of orthogonal tapers in the set of orthogonal tapers applied to the set of samples, and a total number of subcarriers in the at least a subset of the set of subcarriers by performing a heuristic process, wherein the determining the total number of samples, the total number of orthogonal tapers and the total number of subcarriers is based on a pre-determined target miss detection probability and a pre-determined target false alarm probability;
  comparing a test statistic that is based on the multitaper spectral estimates to a threshold to determine whether the set of subcarriers is utilized for primary transmissions to the primary user; and
  receiving data signals on at least one of the subcarriers in the set of subcarriers if the set of subcarriers is not utilized for primary transmissions to the primary user.

2. The method of claim 1, wherein the at least a subset of the set of subcarriers is a subset of the set of subcarriers and wherein the determination of whether the set of subcarriers is utilized for primary transmissions to the primary user is based on the multitaper spectral estimates for only the subset of the set of subcarriers.

3. The method of claim 1, wherein the method further comprises:
selecting a bandwidth resolution with which to determine the multitaper spectral estimates that is less than spacing between the subcarriers in the set of subcarriers.

4. The method of claim 1, wherein the multitaper spectral estimates comprise a multitaper spectral estimate for each subcarrier in the at least a subset of the set of subcarriers and wherein the determining the multitaper spectral estimates further comprises computing averages of the taper spectral estimators to obtain the multitaper spectral estimate for each subcarrier in the at least a subset of the set of subcarriers.

5. The method of claim 4, wherein the method further comprises:
computing a sum of the multitaper spectral estimates as the test statistic, wherein the comparing comprises comparing the sum to the threshold.

6. The method of claim 1, wherein the heuristic process further comprises determining the threshold based on the determined total number of samples, total number of orthogonal tapers and total number of subcarriers.

7. A non-transitory computer readable storage medium comprising a computer readable program, wherein the computer readable program when executed on a computer causes the computer to perform a method for detecting spectrum holes for use in cognitive radio secondary transmissions comprising:
receiving an indication of an assignment of a set of subcarriers to a primary user;
obtaining a set of samples;
determining multitaper spectral estimates for at least a subset of the set of subcarriers based on the assignment of the set of subcarriers to the primary user by processing samples of the set of samples for the at least a subset of the set of subcarriers and by applying a set of orthogonal tapers to the set of samples to obtain taper spectral estimators for each subcarrier in the at least a subset of the set of subcarriers;
determining a total number of samples that is obtained by said obtaining a set of samples, a total number of orthogonal tapers in the set of orthogonal tapers applied to the set of samples, and a total number of subcarriers in the at least a subset of the set of subcarriers by performing a heuristic process, wherein the determining the total number of samples, the total number of orthogonal tapers and the total number of subcarriers is based on a pre-determined target miss detection probability and a pre-determined target false alarm probability;
comparing a test statistic that is based on the multitaper spectral estimates to a threshold to determine whether the set of subcarriers is utilized for primary transmissions to the primary user; and
receiving data signals on at least one of the subcarriers in the set of subcarriers if the set of subcarriers is not utilized for primary transmissions to the primary user.

8. The non-transitory computer readable storage medium of claim 7, wherein the at least a subset of the set of subcarriers is a subset of the set of subcarriers and wherein the determination of whether the set of subcarriers is utilized for primary transmissions to the primary user is based on the multitaper spectral estimates for only the subset of the set of subcarriers.

9. A secondary user receiver system for detecting spectrum holes for use in cognitive radio secondary transmissions comprising:
a receiver configured to obtain a set of samples and process samples of the set of samples for at least a subset of a set of subcarriers;
a multitaper spectral estimation (MTSE) module configured to receive an indication of an assignment of the set of subcarriers to a primary user and to determine multitaper spectral estimates for the at least a subset of the set of subcarriers based on the assignment of the set of subcarriers to the primary user by applying a set of orthogonal tapers to the set of samples to obtain taper spectral estimators for each subcarrier in the at least a subset of the set of subcarriers;
a test statistic computation module configured to determine a total number of samples in the set of samples that is obtained by said receiver, a total number of orthogonal tapers in the set of orthogonal tapers applied to the set of samples, and a total number of subcarriers in the at least a subset of the set of subcarriers by performing a heuristic process, wherein the test statistic computation module is further configured to determine the total number of samples, the total number of orthogonal tapers and the total number of subcarriers based on a pre-determined target miss detection probability and a pre-determined target false alarm probability; and
a comparator configured to compare a test statistic that is based on the multitaper spectral estimates to a threshold to determine whether the set of subcarriers is utilized for primary transmissions to the primary user,
wherein the receiver is further configured to receive data signals on at least one of the subcarriers in the set of subcarriers if the set of subcarriers are not utilized for primary transmissions to the primary user.

10. The system of claim 9, wherein the at least a subset of the set of subcarriers is a subset of the set of subcarriers and wherein the determination of whether the set of subcarriers is utilized for primary transmissions to the primary user is based on the multitaper spectral estimates for only the subset of the set of subcarriers.

11. The system of claim 9, further comprising:
a test statistic computation module configured to select a bandwidth resolution that is less than spacing between the subcarriers in the set of subcarriers, wherein the MTSE module is further configured to determine the multitaper spectral estimates based on the selected bandwidth resolution.

12. The system of claim 9, wherein the multitaper spectral estimates comprise a multitaper spectral estimate for each subcarrier in the at least a subset of the set of subcarriers and wherein the MTSE module is further configured to determine the multitaper spectral estimates by computing averages of the taper spectral estimators to obtain the multitaper spectral estimate for each subcarrier in the at least a subset of the set of subcarriers.

13. The system of claim 12,
wherein the test statistic computation module is further configured to compute a sum of the multitaper spectral estimates as the test statistic, and wherein the comparator is further configured to compare the sum to the threshold.

14. The system of claim 9, wherein the test statistic computation module is further configured to determine the threshold based on the determined total number of samples, total number of orthogonal tapers and total number of subcarriers.

* * * * *